United States Patent [19]

Kikuchi et al.

[11] Patent Number: 4,803,854
[45] Date of Patent: Feb. 14, 1989

[54] PROGRESS INDICATOR FOR A WASHING MACHINE

[75] Inventors: Koji Kikuchi, Osaka; Takatomo Matsumi, Fujiidera; Kazutoshi Takimoto, Yao, all of Japan

[73] Assignee: Sharp Kabushiki Kaisha, Osaka, Japan

[21] Appl. No.: 129,894

[22] Filed: Nov. 24, 1987

Related U.S. Application Data

[63] Continuation of Ser. No. 790,318, Oct. 23, 1985, abandoned.

[30] Foreign Application Priority Data

Jan. 9, 1985 [JP] Japan .................................. 60-2796

[51] Int. Cl.⁴ .............................................. D06F 33/02
[52] U.S. Cl. ................................ 68/12 R; 340/309.15; 340/309.4; 340/525
[58] Field of Search ...................... 68/12 R; 134/113; 340/525, 309.4, 309.15

[56] References Cited

U.S. PATENT DOCUMENTS

| | | | |
|---|---|---|---|
| 3,888,269 | 6/1975 | Bashark | 68/12 R X |
| 4,335,592 | 6/1982 | Torita | 68/12 R |
| 4,372,134 | 2/1983 | Matsuo | 68/12 R |
| 4,449,384 | 5/1984 | Jones | 68/12 R |

FOREIGN PATENT DOCUMENTS

| | | | |
|---|---|---|---|
| 2806150 | 8/1979 | Fed. Rep. of Germany | 68/12 R |
| 2950929 | 4/1981 | Fed. Rep. of Germany | 68/12 R |
| 00096 | 1/1984 | Japan | 68/12 R |
| 46993 | 3/1984 | Japan | 68/12 R |

*Primary Examiner*—Philip R. Coe
*Attorney, Agent, or Firm*—Flehr, Hohbach, Test, Albritton & Herbert

[57] ABSTRACT

A progress indicator for a washing machine comprises display means having six light-emitting elements to indicate which stage of a washing or rinsing cycle the machine is in. The display means are controlled by signals outputted from detectors of turbidity and the amount of water in the tank. Although the operation is not temporally controlled, say, but a timer, this indicator can accurately display the progress of operation.

9 Claims, 3 Drawing Sheets

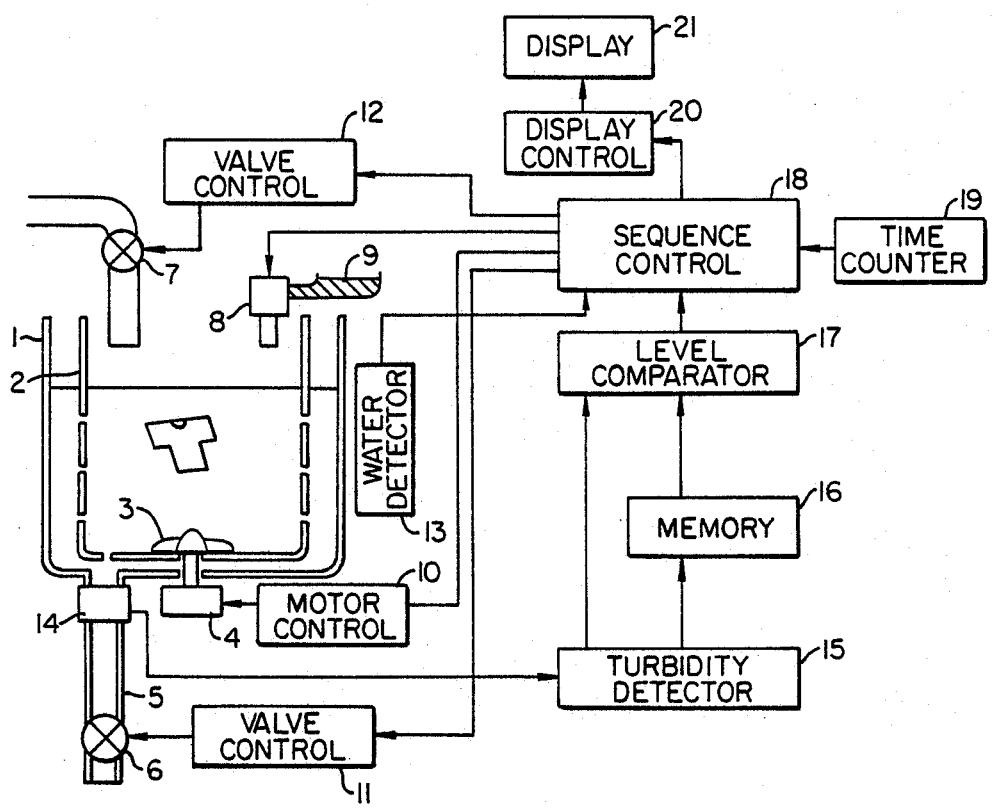
FIG._1.
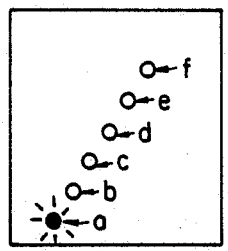
FIG._2.

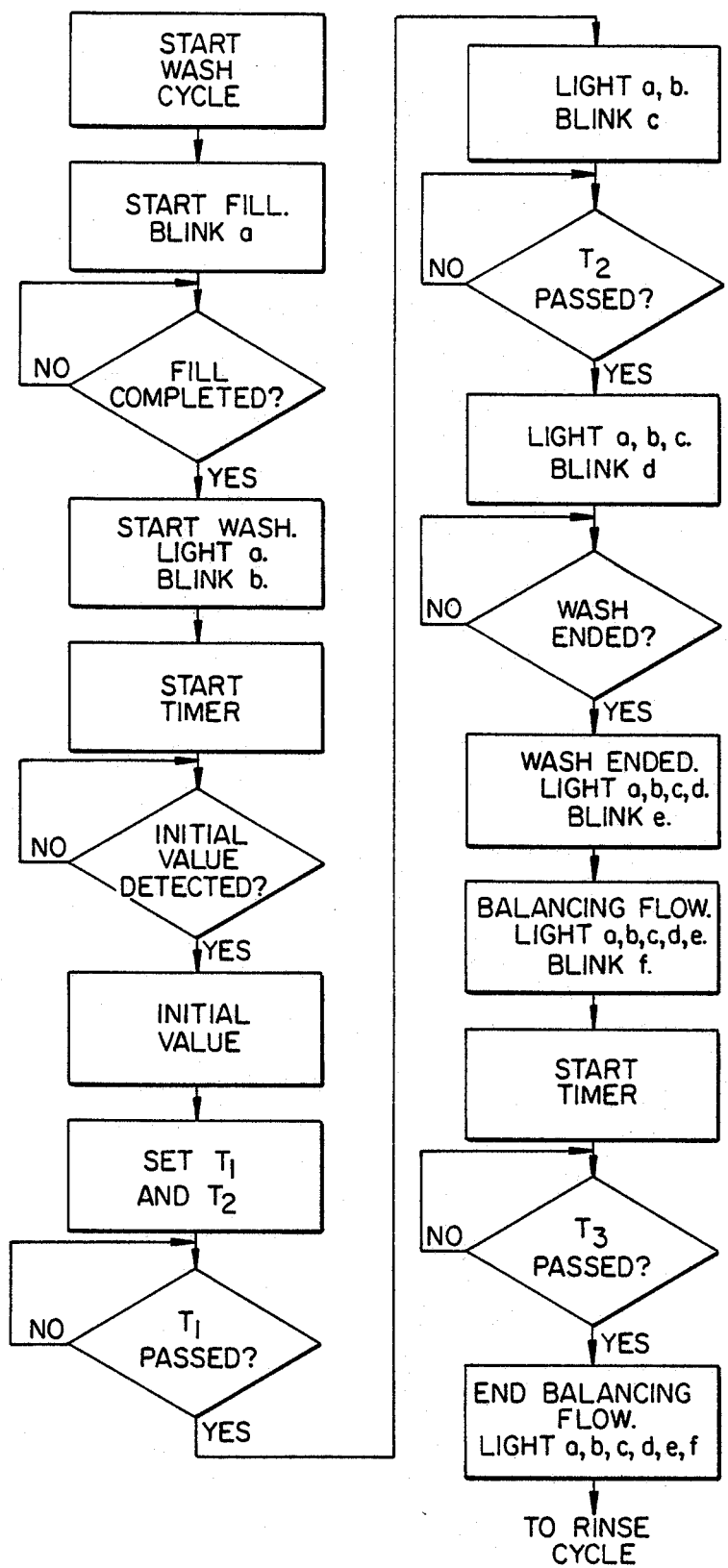
FIG._4.

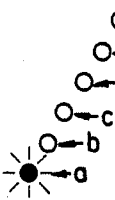
FIG._3.
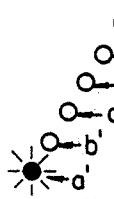
FIG._5.

PROGRESS INDICATOR FOR A WASHING MACHINE

This is a continuation of application Ser. No. 790,318, filed Oct. 23, 1985, and now abandoned.

This invention relates to a washing machine which determines the durations of its operation cycles such as washing, rinsing and spinning cycles by detecting changes in conditions such as the turbidity of its cleaning water and the amount of water in its tank. More particularly, this invention relates to an indicator for such a washing machine adapted to indicate the progress of its operations within a cycle.

Recently, there have been developed many types of washing machines which are equipped with a detector for optically measuring the turbidity of cleaning water and automatically stopping the washing operation by using this detector to monitor the rate of change in measured turbidity. It is difficult, however, to provide a progress indicator for such washing machines because the timing of the washing operation is not uniformly the same in all situations. This is unlike the situation with a conventional washing machine which controls the washing operation by means of a timer.

It is therefore an object of this invention to provide an indicator for a washing machine of the aforementioned type by means of which progress in operation within a cycle can be accurately displayed.

Additional objects, advantages and novel features of the invention will be set forth in part in the description which follows, an in part will become apparent to those skilled in the art upon examination of the following or may be learned by practice of the invention. The objects and advantages of the invention may be realized and attained by means of the instrumentalities and combinations particularly pointed out in the appended claims.

The above and other objects of the present invention are achieved by providing a progress indicator which comprises a means for displaying progress of operation and a display control means adapted to switch the display by this means in a step-wise manner on the basis of values detected by a detector forming a part of the washing machine.

The accompanying drawings, which are incorporated in and form a part of the specification, illustrate an embodiment of the present invention and, together with the description, serve to explain the principles of the invention.

FIG. 1 is a block diagram of a control system for a washing machine embodying the present invention.

FIG. 2 is a schematic front view of a display means for the washing machine of FIG. 1.

FIG. 3 is a drawing for explaining the meaning of display on the display means of FIG. 2 related to a washing cycle.

FIG. 4 is a flow chart for the display operation related to a washing cycle.

FIG. 5 is a drawing for explaining the meaning of display on the display means of FIG. 2 related to a rinsing cycle.

FIG. 1 is a block diagram of a control system for a washing machine according to the present invention. Reference being made to FIG. 1, numeral 1 is a water tank, numeral 2 is a wash tank which is also used for spinning process, numeral 3 is a pulsator, numeral 4 is a motor, numeral 5 is a draining route containing a drain valve 6 inserted therein, numeral 7 is a supply valve for supplying water into the wash tank 2, numeral 8 is a means for supplying detergent 9 into the wash tank 2, numeral 10 is a motor-controlling means for controlling the operation of the motor 4, numeral 11 is a drain valve controlling means for switching on and off the drain valve 6, numeral 12 is a supply valve control means for switching on and off the supply valve 7, and numeral 13 is a water volume detector for detecting the amount of water inside the wash tank 2. Numeral 14 is a detector (turbidimeter) comprising a light-emitting element and a light-receiving element for optically measuring the turbidity of the liquid inside the wash tank 2 and transmitting a signal to a turbidity detection means 15. Numeral 16 is a memory means for storing values detected by the turbidity detection means 15. Numeral 17 is a level comparator for comparing the levels of values detected by the turbidity detection means 15 and those stored in the memory means 16. Numeral 18 is a sequence control means for automatically controlling a series of operations sequentially such as supplying water, adding detergent, washing, draining, rinsing and spinning by controlling the various control means 10, 11, 12, the detergent-supplying means 8, etc. Numeral 19 is a time counter, numeral 20 is a display control means and numeral 21 is a display means.

A display means for a washing cycle is illustrated in FIG. 2. A washing cycle includes operations such as supplying water into the wash tank 2 (fill), washing and balancing flow operation (to be explained below). Its progress is displayed, according to the embodiment shown here, by a display means provided with six light-emitting elements a through f such as light-emitting diodes. The display operation for a washing cycle is explained next by way of the embodiment described above and by referring to the drawing of FIG. 3 and the flow chart of FIG. 4.

When a washing cycle is started, the water supply valve 7 is put in the ON condition and not only is the supplying of water (fill) started but also the light-emitting element a begins to blink (condition "1" of FIG. 3) to indicate that water is now being supplied. When the water level reaches a predetermined height, the water supply valve 7 is switched to the OFF condition to stop the supplying of water. At the same time, the motor 4 is driven to start the washing operation by means of the pulsator 3 while the light-emitting elements a and b are respectively made to stay lit and to blink (condition "2" of FIG. 3) to indicate that the washing operation has started.

After a certain period of time, when the turbidity detection means 15 determines that an initial value to be used for the determination of time to end the washing should be inputted, the turbidity value of the cleaning water at this time is read through the turbidimeter 14 and stored as the initial value in the memory means 16. At the same time, an estimated termination time of the washing cycle is computed on the basis of this initial value and time intervals $T_1$ and $T_2$ for defining the second and final stages of the washing operation are set on the basis of the estimated termination time. If the estimated termination time is 15 minutes, for example, $T_1$ and $T_2$ may be set respectively to five minutes and ten minutes.

When a time interval equal to $T_1$ has passed from the beginning of the washing operation, the light-emitting elements a and b are made to stay lit while the light-emitting element c is made to blink (condition "3" of FIG. 3) to indicate that the washing cycle has progressed from the initial stage into the second stage. Thereafter, when a time interval equal to $T_2$ has passed from the beginning of the washing operation, the light-emitting elements a, b and c are made to stay lit while the light-emitting element d is made to blink (condition "4" of FIG. 3) to indicate that the washing cycle has progressed further from the second stage into the final stage.

Still later, when the temporal rate of change in turbidity of the cleaning water as detected by the turbidity detection means 15 becomes less than a predetermined minimum rate value, it is decided to end the washing cycle and the light-emitting elements a, b, c and d are made to light up while the light-emitting element e is caused to blink (condition "5" of FIG. 3) to indicate the end of the washing operation. Thus, the level of progress in a washing cycle can be approximately understood by the display in these four stages.

When the washing cycle comes to an end, the motor 4 is driven for a balancing flow operation and the light-emitting elements a, b, c, d and e are made to light up while the light-emitting element f is caused to blink (condition "6" of FIG. 3) to indicate the beginning of a balancing flow operation. By the balancing flow is meant a gentle flow of water for correcting the uneven distribution of the articles being washed. After this operation is continued for a period of $T_3$ (about 30 seconds), the next process (that is, rinsing) is started.

The display means for rinsing cycle similarly comprises six light-emitting elements a' through f' as shown in FIG. 5 and they respectively indicate the steps of draining water, supplying water, rinsing (three stages) and balancing flow operations. Displays related to a rinsing cycle are similar to those for a washing cycle. Details of the mode of display for a rinsing cycle will not be explained in detail.

If the washing machine is of the type having a detector for water drops sprinkled away from the wash tank 2 and is adapted to automatically control its spinning cycle on the basis of signals from such a detector, progress in a spinning cycle can also be displayed in the same way as described above.

The foregoing description of a preferred embodiment of the invention has been presented for purposes of illustration and description. It is not intended to be exhaustive or to limit the invention to the precise form disclosed, and obviously many modification and variations are possible in light of the above teachings. The embodiment was chosen and described in order to best explain the principles of the invention and its practical application to thereby enable others skilled in the art to best utilize the invention in various embodiments and with various modifications are suited to the particular use contemplated.

What is claimed is:

1. In a washing machine which contains detectors for monitoring conditions therein during an operating cycle such as washing, rinsing and spinning and is adapted to determine the time to end said cycle on the basis of output signals indicative of said conditions from said detectors, a progress indicator comprising
a display means for displaying progress of operation of said washing machine, and
a display control means adapted to switch the display pattern of said display means in a step-wise manner directly in response to said output signals.

2. The progress indicator of claim 1 wherein said display means includes a plurality of light-emitting elements.

3. The progress indicator of claim 1 wherein said detectors include a turbidimeter for measuring turbidity of cleaning water in said washing machine.

4. The progress indicator of claim 3 further comprising a sequence control means for computing a termination time of a washing cycle of said washing machine from an initial value determined by said turbidimeter.

5. The progress indicator of claim 4 wherein said display control means causes said display means to display progress of operation with reference to said termination time determined by said sequence control means.

6. The progress indicator of claim 1 wherein said detectors include a means for measuring the amount of water contained in said washing machine.

7. A washing machine comprising
a tank containing water,
detector means for measuring water conditions in said tank during an operation cycle of said washing machine such as washing, rinsing and spinning, inclusive of initial water conditions at an initial time during said operation cycle and outputting a signal indicative of said measured water conditions,
a display means for displaying progress of operation of said washing machine in said operation cycle, and
control means for calculating a termination time of said operation cycle on the basis of said signal indicative of said initial water conditions.

8. The washing machine of claim 7 wherein said control means switch display patterns of said display means in a step-wise manner directly in response to said signal outputted from said detector means.

9. The washing machine of claim 7 wherein said detector means include a turbidimeter.

* * * * *